United States Patent [19]

Colosimo et al.

[11] 4,148,598

[45] Apr. 10, 1979

[54] EXTRUSION DIE FOR SAUSAGE AND THE LIKE

[76] Inventors: Gabriel A. Colosimo; Ernest Colosimo, both of 9009 W. 2700 South, Magna, Utah 84044

[21] Appl. No.: 830,838

[22] Filed: Sep. 6, 1977

[51] Int. Cl.$^2$ .............................................. A22C 7/00
[52] U.S. Cl. ........................................ 425/464; 17/32
[58] Field of Search ................. 425/464; 72/261, 257; 17/32

[56] References Cited

U.S. PATENT DOCUMENTS

| 3,152,362 | 10/1964 | Carter | 425/464 |
| 3,948,079 | 4/1976 | Fuchs, Jr. | 425/464 X |

Primary Examiner—Frank T. Yost
Attorney, Agent, or Firm—B. Deon Criddle

[57] ABSTRACT

A press for forming and shaping foodstuffs. The press has an extrusion die containing a plurality of open ended elongated passages and a V-shaped common inlet. Attachments to the press provide a convenient and easy method of further processing rough sized extruded foodstuffs.

1 Claim, 4 Drawing Figures

U.S. Patent  Apr. 10, 1979  4,148,598
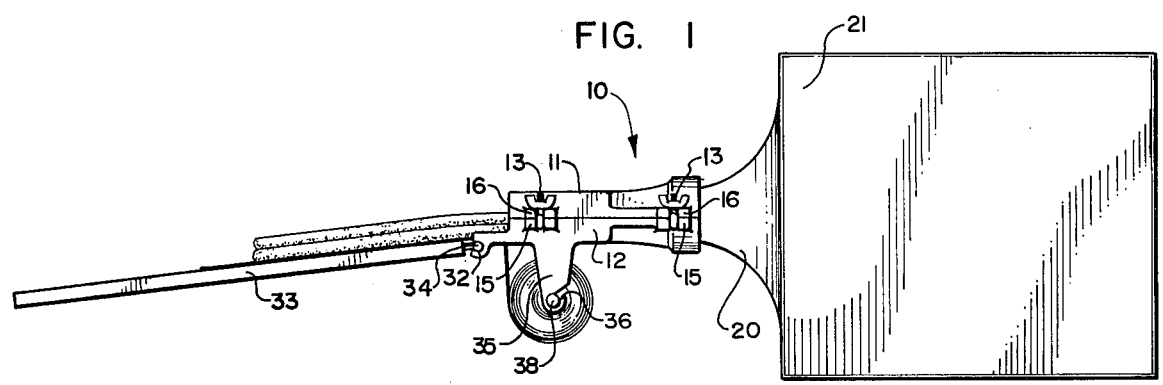
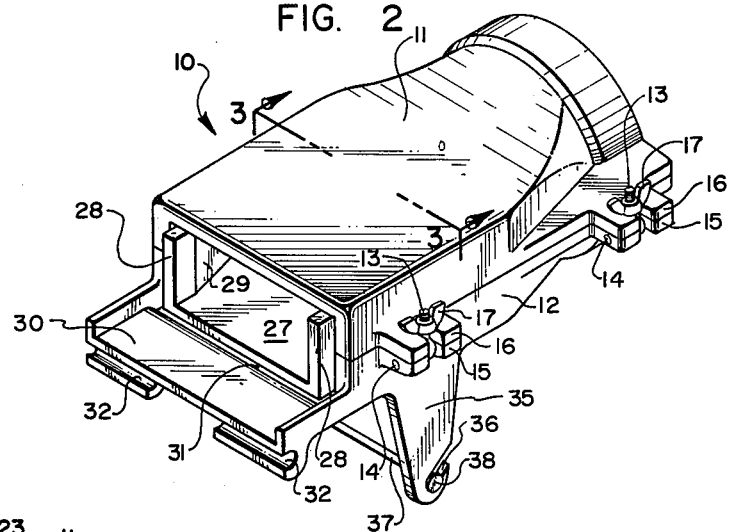
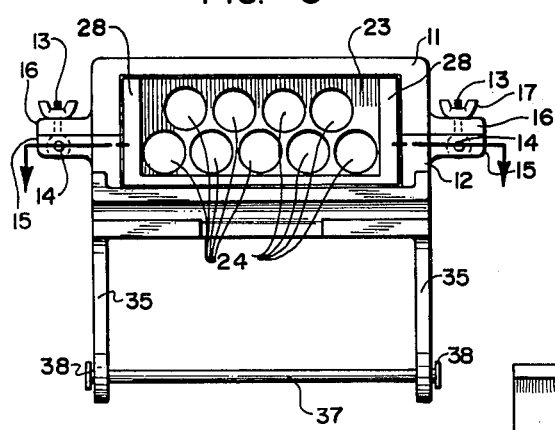
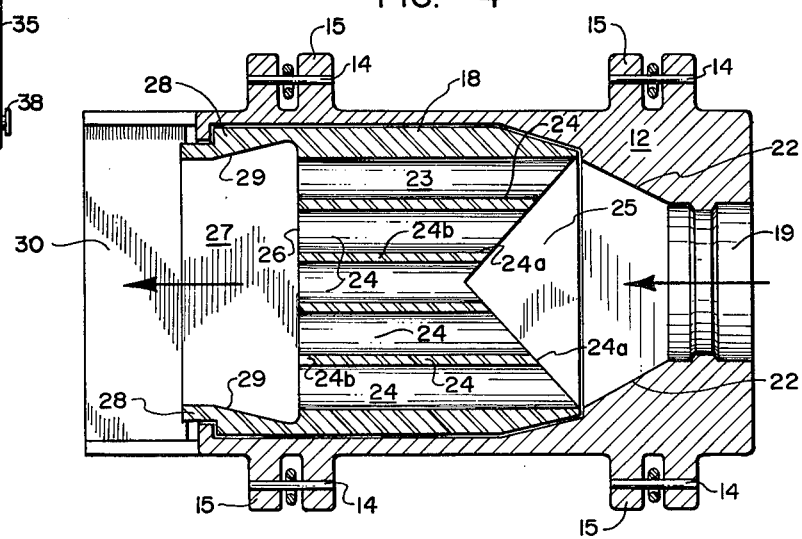

EXTRUSION DIE FOR SAUSAGE AND THE LIKE

BRIEF DESCRIPTION OF THE INVENTION

1. Field of the Invention

This invention relates to an apparatus for making extruded foodstuffs such as skinless link-style sausages, artificial meat products, and the like.

2. Prior Art

Various attachments for meat grinders that are to be used to process meat into commercial products are common and widely used. Extrusion dies, with multiple elongated open passages are also well known.

However, to the best of our knowledge no other meat processing devices have been heretofore developed wherein a forming press is attached directly to the discharge of a meat grinder and that includes attachments to the press to measure out and prepare extruded ribbons of foodstuffs for easy handling in subsequent packaging operations.

SUMMARY OF THE INVENTION

It is a principle object of the present invention to provide a food extruder press and die assembly adapted to be connected directly to the discharge of a conventional food grinder. Another object is to provide such an assembly with attachments useful to roughly size increments of the extruded foodstuffs to thereby reduce the number of handling steps required in processing such foodstuffs for commercial sale.

Other objects are to provide a forming press that can be directly connected to a conventional food grinder and that will produce a plurality of extruded ribbons by extrusion of the foodstuff processed through the grinder through the press.

Still another object is to provide a forming press for skinless link-style sausages and the like consisting of body halves coupled together, and containing therein an extrusion die providing a plurality of open elongated passages and having a V-shaped common inlet adapted to receive foodstuffs to be extruded under pressure from a food grinder.

Still other objects are to provide a forming press for skinless link sausages and the like, including attachments which will permit foodstuff extruded from the press to be forced down a ramp where it will fall upon and unroll an incrementally pre-marked paper that then provides a continuous paper base for the extruded ribbons.

Still another object is to provide a ramp attachment for a forming press on which foodstuff formed using the press of the invention are travelled on the pre-marked paper base.

It is another object to provide a roll of pre-marked paper arranged to be attached to the forming press so that ribbons of foodstuffs from the press can be rough sized as they are extruded onto the paper base.

Principle features of the present invention include a forming press adapted to be connected to the outlet of a conventional meat grinder or the like, which forming press contains a plurality of elongated open extrusion passages to produce multiple ribbons of foodstuffs as food material is forced through the press. Attachments to the press include a ramp to conduct the foodstuff ribbons away from the press as they are extruded; and a pre-marked paper that is unrolled by the extruded ribbons to provide a continuous paper base for the extruded foodstuffs. The paper is pre-marked to provide a means for rough sizing the extruded foodstuffs prior to the time they are frozen and are thereafter accurately cut to precise size and weight.

The forming press of the invention may be connected directly to a conventional meat grinder using a connection adaptor. With the use of an appropriate adaptor, virtually all conventional types and sizes of food grinders may be used with the press.

The forming press includes two body halves which are coupled together in a mating relationship during use. The mated body halves form a central cavity, with openings on each end. One opening serves as an inlet receiving foodstuffs from the outlet of the grinder, and the other opening at an opposite end of the press serves to guide ribbons of foodstuffs extruded through the press.

An extrusion die containing a plurality of open, elongated, extrusion bores is positioned within the central cavity. The extrusion die is positioned in the cavity such that the extrusion bores are aligned with the openings at the opposite ends of the cavity. A V-shaped inlet, common to each of the bores, is formed in the inlet opening of the press, at the opposite end of the extrusion die the bore ends are flush with one another and a lower surface and sidewalls interconnected by the lower surface extend from the opposite end of the die beyond the flush ends of the bores. The inner surface of the interconnected sidewalls converge gradually inwardly as they extend beyond the flush bore ends to slightly constrict the space between the sidewalls.

The lower body half has flanges which extend beneath the body half at each side, near the extrusion end. Each flange has an angled slot in the lower portion thereof. A support rod extends horizontally to slide downwardly in each angled flange slot. The support rod is removable out of the slots so that a roll of paper may be placed upon the rod. When the rod is set into position between the flanges, with its ends in the angled slots, the roll of paper thereon is positioned centrally beneath the press.

An extension at the discharge end of the lower body half of the press has a groove formed thereberneath. The grooves serves as an extending platform groove to which a ramp can be connected, thereby providing an extension platform on which extruded foodstuffs may be deposited.

A paper roll is placed on the bar supported by the depending flanges on the lower body. Desirably, the paper is marked in even graduations as a rough size measuring means. Paper is fed onto the extension at the discharge end of the lower body half of the press through a slot provided in the body for the purpose.

Foodstuff is discharged from the discharge outlet of the food grinder into the inlet opening of the two body halves of the press. The foodstuff moves into the cavity of the press and into the V-shaped common inlet opening of the extrusion die. It is forced into the extrusion passages of the die and exits the bores as ribbons, having a circular cross-sectional configuration. The inner surface of the walls extending beyond the flush end of the bores compress the foodstuff ribbons inwardly. The foodstuff is deposited on the extension of the lower body half and onto paper coming off the roll and fed through the extension. The foodstuff then moves down the ramp which is connected to the underside of the extending lip and away from the press for further processing. The frictional engagement of the foodstuff ribbons with the paper causes the paper to unroll and to slide down the ramp with the ribbon thereon to thereby provide a continuous paper base beneath the food product. The graduated marks on the paper provide a rough size measurement for packaging.

Additional objects and features of the invention will become apparent from the following detailed description, taken together with the accompanying drawings.

THE DRAWING

In the drawing:

FIG. 1 is a side elevation view of the food product forming press of the invention, showing it connected to the discharge of a conventional meat grinder and with a paper roll and extension platform positioned for use;

FIG. 2, a perspective view of the food product forming press, taken from slightly above end at one corner of the press on the discharge end;

FIG. 3, a vertical section view taken on the line 3—3 of FIG. 2; and

FIG. 4, a horizontal sectional view taken on the line 4—4 of FIG. 3, showing the extrusion die within the cavity of the lower body half of the press and the direction of movement through the press.

DETAILED DESCRIPTION

Referring now to the drawings:

In the illustrated preferred embodiment, the food forming press 10, of the present invention includes a upper body half 11 and lower body half 12. As shown, the body halves are fastened together by bolts 13, that are swivel mounted on a rod 14 that is held by ears 15 formed on the lower body half 12. The bolts 13 extend upwardly between spaced ears 16 formed on the upper body half 11 and nuts 17 can be tightened on the bolts 13 to clamp the two body halves together.

The two body halves 11 and 12, when fastened together, form an inner cavity 18 having openings at each end. The inlet opening 19 (FIG. 4) is adapted to be secured to a discharge outlet 20 (FIG. 1) of a conventional meat grinder 21, and is structured to generally fit such an outlet. Inner surfaces of the walls 22 of the body halves of the press, near the inlet opening 19, are flared outwardly to connect the inlet opening 19 to the cavity 18.

An extrusion die shown generally at 23, is formed to fit snugly in the inner cavity 18. The extrusion die 23, contains a plurality of parallel elongated extrusion passages open at each end of the two body halves of the press. The extrusion die 23, is formed to have a V-shaped common inlet 25 near the inlet opening 19 of the press. The opposite end 26 of the extrusion die 23 is formed such that the ends of the extrusion passages are flush with one another. A portion 27 of the die interconnects sidewalls 28, that extend beyond the flush ends of extrusion passages 23 of the die. The inner surfaces 29 of the extension sidewalls 28 converge gradually inwardly to slightly constrict the opening from the die at that end.

An extension 30 of the lower body half 12 of the press has a groove 31 therein near the opening of the cavity 18. An open tubular slot 32, which serves as a connection for a ramp 33, is positioned slightly beneath the outermost end of the extension 30. The ramp 33 has a bar 34 affixed thereto that is adapted to be connected to the extension 30 by sliding the bar into the open tubular slot 32, and by butting the ramp 33 against the extension. The ramp 33 itself consists of a smooth surfaced board or the like, is the same width as the extension 30, and projects from the press as a surface on which foodstuffs will be deposited.

Legs 35 extend from beneath opposite sides of the lower body halve 12, near the extrusion end. A slot 36, is provided near the lower end of each leg 35 to receive a bar 37. The bar 37 extends horizontally between the legs 35, such that the ends of the bar fit in the slots 36. The bar 37 may be capped or may be upset on each end 38, to keep it from sliding axially out of the slots 36, but can be easily removed from the slots 36. A conventional paper roll may be placed upon the bar 37, such that it rests beneath the lower body half 12, and between the legs 35. The paper is preferably pre-marked in even graduations. The paper is then fed onto the upper surface of the lip 30 through the slot 31 in the lip with the running end of the rod extending through the slot and resting on the upper ramp surface to receive foodstuff deposited thereon.

In operation, a processed foodstuff, such as ground sausage, is discharged from the discharge outlet 20, of the conventional meat grinder 21, into the inlet opening 19 of the press. The foodstuff moves into the cavity 18 of the press and then into the V-shaped common inlet 25 of the extrusion die 23. The foodstuff is then forced into the extrusion passages of the die 23, with fibers of the foodstuff being cut by the sharp edges 24a, of walls 24b, formed by the V-shaped common inlet. The foodstuff then moves through the passages 24, before being extruded at the opposite end 26, in the form of multiple ribbons. The inner surfaces 29, of the sidewalls 28, of the extrusion die 23, compress the product ribbons inwardly as it moves along the lower extended surface 27, of the die 23. The ribbons are deposited on the extension 30, extending from the lower body half 12, and onto the running end of the paper contained thereon. The foodstuff ribbons are pushed down the ramp 33, which is butted to the extension 30 extending from the lower body half 12, of the press, and away from the press. The frictional engagement of the foodstuff ribbons with the paper causes the paper to unroll and to provide a continuous paper base on which the food product ribbons are deposited. The graduated marks on the paper then provide an approximate measurement for packaging operations. The movement through the press is maintained by pressure exerted by the meat grinder 21, and when the meat grinder is not operating, movement through the press ceases.

The present invention represents a food forming press for any type of formable food product such as skinless link-style sausage or texturized vegetable proteins such as soy protein and includes a process whereby ground meat, or other material, moves directly from the discharge outlet of a meat grinder into the press to produce multiple ribbons of the product. The ribbons formed are then conducted away from the press on a paper base for ease in handling. The V-shaped inlet 25, of the extrusion die 23, results in sharp cutting edges 24a, on the ends of walls 24b, of the extrusion passages and, since these edges cut through product fibers, there is far less clogging than will occur in such structures having a flush inlet.

Although a preferred form of our invention has been disclosed herein, it is to be understood that the present disclosure is made by way of example and that variations are possible without departing from the subject matter coming within the scope of the following claims, which subject matter we regard as our invention.

We claim:

1. An extrusion die for use in a food forming press comprising
   (a) a housing;
   (b) a plurality of parallel extrusion passages extending through the housing;
   (c) a V-shaped common inlet formed at one end of the housing and opening to each of the extrusion passages, said common inlet forming angled sharp edges between said passages;
   (d) an end wall at the other end of the housing through which said extrusion passages discharge, with the discharge ends of said passages being flush with one another;
   (e) a bottom portion extending beyond the flush ends of the passages; and
   (f) sidewalls extending upwardly from the bottom portion and converging slightly as they extend from the end wall.

* * * * *